United States Patent [19]

Hoppmann et al.

[11] 4,305,496

[45] Dec. 15, 1981

[54] METHOD OF TRANSPORTING SINGULATED PARTS

[75] Inventors: Kurt H. Hoppmann, Falls Church; George S. McVeigh, Springfield, both of Va.

[73] Assignee: Hoppmann Corporation, Springfield, Va.

[21] Appl. No.: 137,143

[22] Filed: Apr. 4, 1980

[51] Int. Cl.³ .......................... B65B 5/10; B65G 47/00
[52] U.S. Cl. ...................................... 198/420; 53/251; 53/253; 198/450; 198/472
[58] Field of Search ............... 198/420, 450, 472, 481; 53/251, 253, 473; 209/658, 622, 661, 666

[56] References Cited

U.S. PATENT DOCUMENTS

| | | | |
|---|---|---|---|
| 2,745,548 | 5/1956 | Schroeder | 209/658 X |
| 2,855,740 | 10/1958 | Noland, Jr. et al. | 198/420 X |
| 2,987,180 | 6/1961 | Shields | 209/658 X |
| 3,028,713 | 4/1962 | Kennedy et al. | 53/251 |
| 3,505,777 | 4/1970 | Tsutsumi | 53/540 X |
| 3,912,120 | 10/1975 | Hoppmann et al. | 198/392 X |

*Primary Examiner*—Jeffrey V. Nase
*Attorney, Agent, or Firm*—David H. Semmes

[57] ABSTRACT

Centrifugal feeders, particularly a method of transporting singulated parts from the periphery of a centrifugal feeder. The method includes vertically orienting while supporting the parts in nests or notches defined at the periphery of the feeder, advancing the parts away from said supporting and dropping the parts into individual containers or pucks which are transported tangentially away from the centrifugal feeder. The method is characterized by its capability of high speed singulation of parts into any desired matrix.

12 Claims, 9 Drawing Figures

METHOD OF TRANSPORTING SINGULATED PARTS

CROSS-REFERENCE TO RELATED APPLICATIONS

An improvement upon applicant's earlier patents:
CENTRIFUGAL METHOD OF SORTING PARTICULATE ARTICLES (Pat. No. 3,831,734).
ROLLING METHOD OF SUPPORTING PARTICULATE ARTICLES (Pat. No. 4,094,412).

BACKGROUND OF THE INVENTION (1) Field of the Invention

Centrifugal feeding. Recently developed centrifugal feeders, include a plurality of rotating devices which centrifugally discharge articles to be counted from the edges of a rotating plane. Traditionally, the centrifugally distributed articles are forced through separate stationary exit apertures, which align the articles for individual orienting or counting.

The present invention concerns vertical orienting of the parts within nests or notches defined at the periphery of the centrifugal feeder, then dropping the singulated parts into respective containers or pucks which are being rotated at the same speed as the centrifugal feeder. The filled pucks may then be separated via an exit gate, such as a stripper blade or an electric sensor and a powered escapement such as an endless belt extending tangentially away from the centrifugal feeder. The device is particularly adapted to the singulating and transport of parts having complex configurations which preclude conventional handling and support.

(2) Description of the Prior Art
HOAR: U.S. Pat. No. 2,632,588
GARRETT: U.S. Pat. No. 2,763,108
d'AUTHEVILLE: U.S. Pat. No. 3,063,596
PEARSON: U.S. Pat. No. 3,170,627
HURST: U.S. Pat. No. 3,215,310
READ: U.S. Pat. No. 3,253,604
PEARSON: U.S. Pat. No. 3,266,664
HURST: U.S. Pat. No. 3,368,713
HOPPMANN et al.: U.S. Pat. No. 3,669,260
HOPPMANN et al.: U.S. Pat. No. 3,722,674
HOPPMANN et al.: U.S. Pat. No. 3,831,734
HOPPMANN et al.: U.S. Pat. No. 3,900,107
HOPPMANN et al.: U.S. Pat. No. 4,094,412

SUMMARY OF THE INVENTION

According to the present invention, the parts are centrifugally distributed to the periphery of a rotary feeder plane, then pivoted or dropped into nests or notches defined in the feeder periphery. As the parts are aligned vertically within the notches, the parts are supported by a stationary surface positioned beneath the feeder. A plurality of empty parts containers or pucks are rotated beneath the stationary support and in alignment with the notches such that oriented parts, as they are transported away from the area of stationary support are dropped into individual containers, so as to be fully contained within the container or with a portion of each part exposed above or below the container. Then, a stripper blade may be used to engage parts protruding from the rotating containers, so as to divert the filled containers tangentially away from the centrifugal feeder. Alternatively, filled containers may be detected by a sensor device and removed by other types of powered escapements.

Then, empty containers may be rotated again beneath the stationary support in alignment with the individual notches aligned in the periphery of the centrifugal pucks after stripping. Filled containers or pucks may be re-aligned in any desired matrix for counting, packaging, or the like. The parts are then discharged or removed from the pucks and placed into individual packages or containers by any number of conventional means, the empty pucks may then be rotated again into alignment with the individual notches defined in the centrifugal feeder periphery.

DESCRIPTION OF THE PREFERRED EMBODIMENTS

Figure 1:
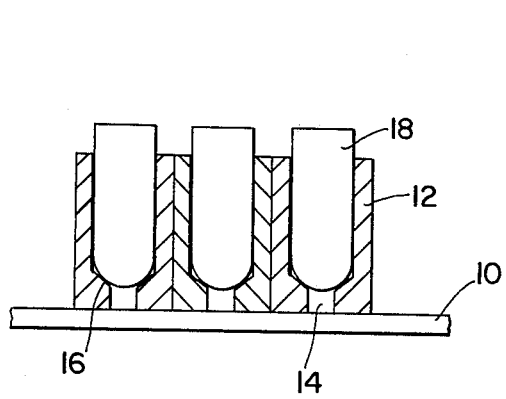
FIG. 1 is a fragmentary elevation, partially in section, showing filled pucks supported upon an accumulating track or belt, such that a portion of each part is exposed above the puck.
Figure 7:
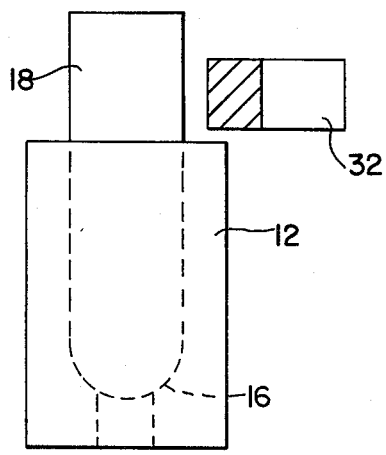
FIG. 7 is an enlarged elevation, showing a part supported within a puck, such that the exposed portion of the part may be engaged by a stripper blade.
Figure 8:
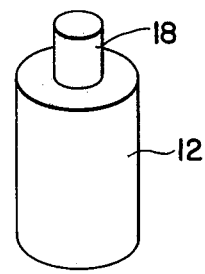
FIG. 8 is an enlarged perspective, showing a filled puck, having the supported part protruding vertically thereof.

In FIG. 1 there is illustrated container or puck 12 having bottom aperture 14 and concave interior, defined by lower support shoulder 16, such that a portion of supported part 18 protrudes vertically thereof. Manifestly, part 18 may be protruded downwardly of puck 12 or be contained entirely therein. The container 12 may be transported upon an accumulating track or belt 10 rotated beneath the centrifugal feeder 20. In FIGS. 7 and 8, the filled pucks or containers 12 are shown supporting the oriented parts 18.

Figure 2:
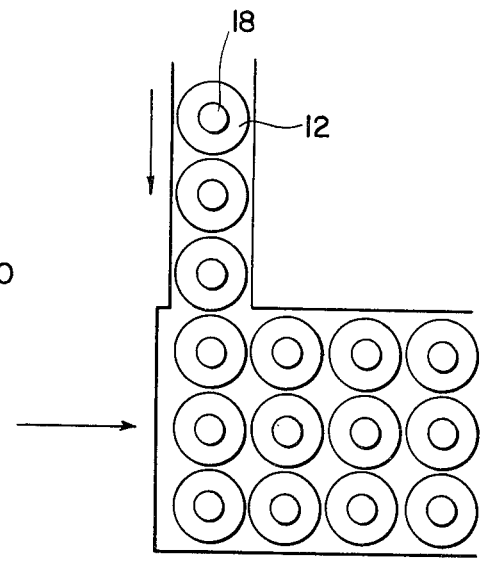
FIG. 2 is a fragmentary top plan showing the filled pucks placed into a matrix, such that the centerline spacing is determined by the diameter of the pucks.

In FIG. 2 the filled pucks 12 are shown being placed into a matrix such that the centerline spacing of the parts is determined by the diameter of the individual pucks.

Figure 3:
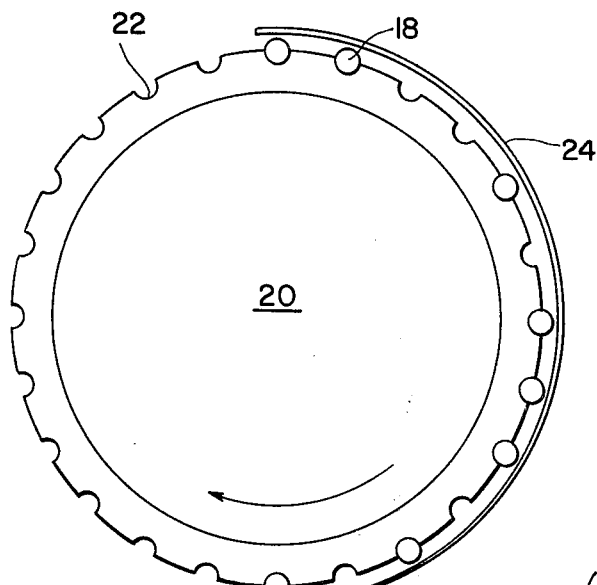
FIG. 3 is a top plan, showing radial distribution of oriented parts into individual notches defined in the centrifugal feeder periphery.
Figure 4:
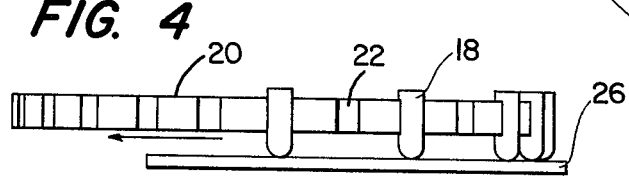
FIG. 4 is a side elevation, showing support of the vertically oriented parts by means of a stationary floor positioned beneath the centrifugal feeder.

In FIG. 3 there is illustrated the rotating transport of the vertically oriented parts 18 by means of centrifugal feeder 20 and stationary guide rail 24. As illustrated in FIG. 4, oriented parts 18 are supported from below by means of stationary floor 26, which defines a loading zone arcuate sector beneath centrifugal feeder 20.

Figure 5:
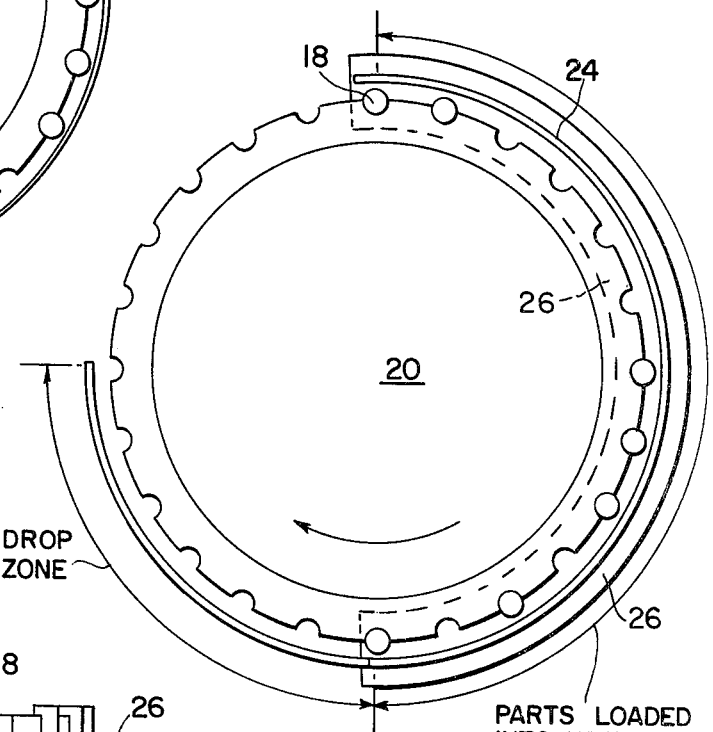
FIG. 5 is a top plan, showing rotary delivery of the oriented part away from a loading zone segment of rotation and into a drop zone segment, defined by elimination of the supporting surface beneath the vertically oriented parts.
Figure 9:
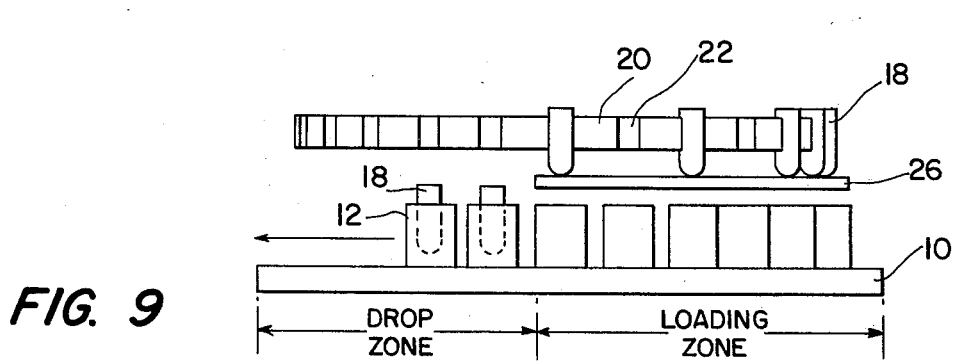
FIG. 9 is a side elevation, showing superpositioning of the centrifugal feeder with the vertically oriented parts at the feeder periphery, the median horizontal stationary support surface defining the loading zone arcuate segment beneath the feeder, and the lower accumulating track or belt rotating the pucks through the loading zone and drop zone.

In FIGS. 4, 5 and 9 there is illustrated the dropping of the individual parts 18 from peripheral nests or notches 22 and into pucks 12, as the centrifugal feeder is rotated beyond supporting surface or floor 26. The dropped parts 18 are supported in vertical orientation within containers or pucks 12 which advance upon endless track or belt 10.

Figure 6:
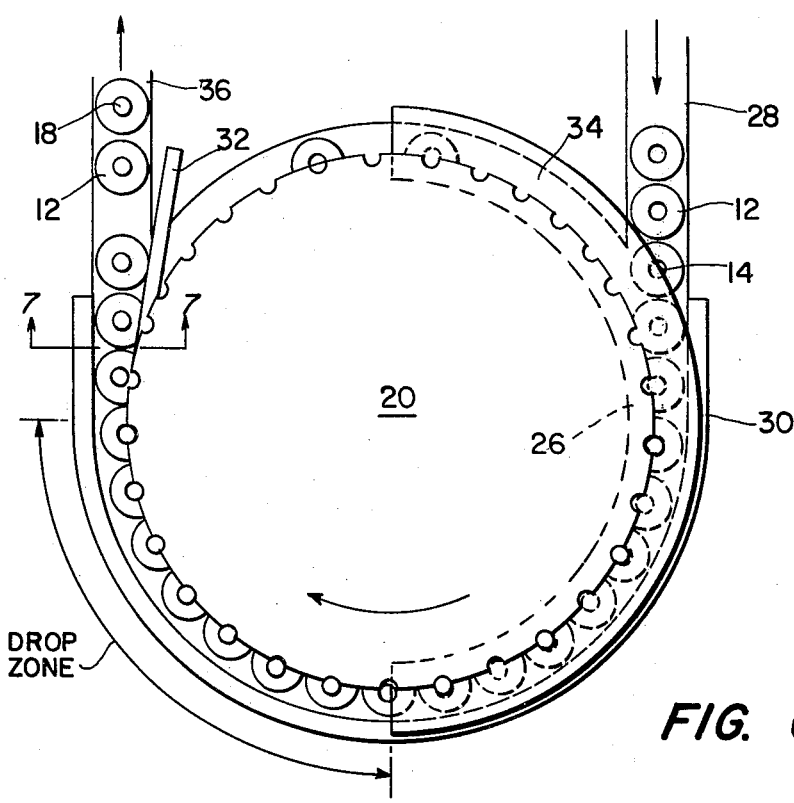
FIG. 6 is a partially fragmentary top plan, showing on the right-hand side, delivery of empty pucks or containers into the loading zone arcuate segment, and, on the left-hand side, removal of filled pucks, sequentially of the drop zone arcuate segment, by means of a stripper blade and rotary recirculation of empty pucks.

In FIG. 6 there is illustrated the use of a peripheral guide rail 30, so as to retain the pucks 12 during the rotary transport. Doctor or stripper blade 32 is employed to intersect the exposed portions of parts 18 which are supported in the filled pucks. Tangential removal of loaded pucks may be effected by endless track 36 or the like. Empty pucks 12 may be recirculated through intermediate arcuate sector 34 and into the loading zone arcuate sector. These pucks, which have been emptied, may be returned tangentially via endless belt, roller track or similar means 28 to the loading zone sector.

Manifestly, various types of exit gate devices other than doctor or stripper blade 32 may be employed. For example, a sensor may be used to detect either the presence or absence of a part with the container 18. This sensor, in turn, may generate a signal which activates a powered escapement to remove filled pucks, while permitting empty pucks to be returned to the loading zone and into alignment with the nests.

Traditionally, centrifugally oriented parts have been delivered tangentially into an accumulating track from which the parts are individually drawn, as required. The accumulating track is generally constructed to assemble the parts, such that each oriented part touches an adjoining part. Such accumulator systems work well for parts having simple configurations. However, parts having complex configurations cannot be handled in this manner. Traditionally, such parts necessarily are hand loaded into empty containers. The present system, as will be apparent, allows the parts to be loaded directly from the feeder into the pucks which permits automatic loading of those parts which previously had to be hand loaded.

The present system provides for centrifugal loading of the parts by pivoting into orienter nests and, thence, into pucks or containers without the necessity for accumulating and respacing. Since all of the orienter nests will not be filled with vertically oriented parts, some of the pucks will not be loaded. These empty pucks are re-delivered into the arcuate loading zone sector and into vertical alignment with those parts which have been oriented in the orienter nests 22, defined in the periphery of the centrifugal feeder 20. As the vertically oriented parts are transported away from the support floor, the vertically oriented parts are dropped into the individual rotating containers or pucks 12. Pucks 12 are removed from the rotation cycle by means of a stripper blade or electronic sensor and escapement, while the unfilled pucks will be returned to the loading zone arcuate sector.

Manifestly, variously configured centrifugal feeders and pucks may be employed without departing from the spirit of invention.

We claim:

1. Method of transporting singulated parts from a centrifugal rotating feeder wherein the parts are supported at the periphery of the feeder comprising:
  (A) vertically orienting by pivoting said parts;
  (B) supporting said parts sequentially of said pivoting, from below;
  (C) rotating a plurality of empty containers into alignment with said parts;
  (D) advancing said parts away from said supporting and dropping said parts into said containers, such that a portion of each part protrudes vertically from said containers;
  (E) transporting said containers tangentially away from the centrifugal rotating feeder;
  (F) stripping loaded containers by contacting said parts protruding from said containers and tangentially conveying said loaded containers away from the centrifugal feeder; and
  (G) recirculating empty containers.

2. Method of transporting singulated parts as in claim 1, including continuing rotating loaded containers sequentially of said supporting.

3. Method of transporting singulated parts as in claim 2, wherein said transporting of loaded conveyors tangentially away from said centrifugal feeder is by endless conveyor.

4. Method of transporting singulated parts as in claim 3, including vertically orienting by pivoting said parts within individual notches defined in the periphery of the centrifugal rotating feeder.

5. Method of transporting singulated parts as in claim 4, wherein said notches are of semi-circular cross-section.

6. Method of transporting singulated parts as in claim 5, including radially inwardly pressing said parts into said notches prior to dropping.

7. Method of transporting singulated parts as in claim 6, including re-delivering empty containers into alignment with said vertical orienting of parts.

8. Method of transporting singulated parts as in claim 7, including discharging parts from loaded containers prior to said re-delivering.

9. Method of transporting singulated parts as in claim 8, wherein said re-delivering of empty containers is tangentially with respect to said centrifugal rotary feeder.

10. Method of transporting singulated parts as in claim 9, wherein said rotating of empty containers is at the same rotating speed as the centrifugal feeder.

11. Method of transporting singulated parts as in claim 10, including guiding loaded containers into a matrix such that the diameter of said containers defines centerline spacing of singulated parts.

12. Method of transporting singulated parts as in claim 11, wherein said container interiors are conformed complementary to said parts.

* * * * *